United States Patent
Kovács et al.

(10) Patent No.: US 12,537,675 B2
(45) Date of Patent: Jan. 27, 2026

(54) QUANTUM COMMUNICATION METHOD AND APPARATUS

(71) Applicant: Telefonaktiebolaget LM Ericsson (publ), Stockholm (SE)

(72) Inventors: Benedek Kovács, Budapest (HU); Zsolt Kis, Pilisvörösvár (HU); László Bacsárdi, Sopron (HU); Sándor Imre, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 281 days.

(21) Appl. No.: 18/556,763

(22) PCT Filed: Apr. 29, 2021

(86) PCT No.: PCT/EP2021/061290
§ 371 (c)(1),
(2) Date: Oct. 23, 2023

(87) PCT Pub. No.: WO2022/228684
PCT Pub. Date: Nov. 3, 2022

(65) Prior Publication Data
US 2024/0372712 A1   Nov. 7, 2024

(51) Int. Cl.
*H04L 9/08*   (2006.01)
*H04L 43/087*   (2022.01)

(52) U.S. Cl.
CPC .......... *H04L 9/0852* (2013.01); *H04L 43/087* (2013.01)

(58) Field of Classification Search
None
See application file for complete search history.

(56) References Cited

U.S. PATENT DOCUMENTS

2006/0062392 A1*   3/2006   Lee ............... H04L 9/0852
                                                  380/278
2013/0142328 A1   6/2013   Shibata et al.
(Continued)

FOREIGN PATENT DOCUMENTS

| CN | 106230585 A | 12/2016 |
| CN | 107896148 A | 4/2018 |
| WO | 2020151219 A1 | 7/2020 |

OTHER PUBLICATIONS

L. O. Mailloux, M. R. Grimaila, D. D. Hodson, G. Baumgartner and C. McLaughlin, "Performance Evaluations of Quantum Key Distribution System Architectures, " in IEEE Security & Privacy, vol. 13, No. 1, pp. 30-40, Jan.-Feb. 2015, doi: 10.1109/MSP.2015.11. (Year: 2015).*

(Continued)

*Primary Examiner* — Philip J Chea
*Assistant Examiner* — James Ross Hollister
(74) *Attorney, Agent, or Firm* — Murphy, Bilak & Homiller, PLLC (57) ABSTRACT

A method (100) of quantum communication, the method comprising steps of: receiving (102) data for encrypted transmission on an optical channel; determining (104) a fill level of a key buffer storing shared secret key bits distributed by a quantum key distribution, QKD, system via the optical channel; determining (106) a bandwidth and an encryption technique for encrypted transmission of the data dependent on the determined fill level; encrypting (108) the data using the determined encryption technique; transmitting (110) the encrypted data at the determined bandwidth on the optical channel; determining (112) a quantum key generation rate required to support ongoing encrypted transmission of data on the optical channel at the determined bandwidth and encryption technique; and configuring (114) the QKD system to perform quantum key generation at the determined (Continued)

quantum key generation rate. Quantum communication apparatus configured to implement the method.

20 Claims, 5 Drawing Sheets

(56) References Cited

U.S. PATENT DOCUMENTS

| | | | |
|---|---|---|---|
| 2014/0086412 A1 | 3/2014 | Shibata | |
| 2016/0218867 A1* | 7/2016 | Nordholt | H04L 9/0852 |
| 2017/0346627 A1* | 11/2017 | Alleaume | H04L 9/0858 |
| 2021/0152532 A1* | 5/2021 | Reinhold | H04L 9/0643 |
| 2022/0173896 A1* | 6/2022 | Rahman | H04L 9/0827 |
| 2022/0209943 A1* | 6/2022 | Syrivelis | G06N 10/00 |
| 2025/0080336 A1* | 3/2025 | Bucklew | H04L 9/12 |

OTHER PUBLICATIONS

O. Cangea, C. S. Oprina and M. -O. Dima, "Implementing quantum cryptography algorithms for data security," 2016 8th International Conference on Electronics, Computers and Artificial Intelligence (ECAI), Ploiesti, Romania, 2016, pp. 1-6, doi: 10.1109/ECAI.2016. 7861116. (Year: 2016).*

W. Maeda, A. Tanaka, S. Takahashi, A. Tajima and A. Tomita, "Technologies for Quantum Key Distribution Networks Integrated With Optical Communication Networks," in IEEE Journal of Selected Topics in Quantum Electronics, vol. 15, No. 6, pp. 1591-1601, Nov.-Dec. 2009, doi: 10.1109/JSTQE.2009.2032664 (Year: 2009).*

Bahrami, Arash , et al., "Quantum key distribution integration with optical dense wavelength division multiplexing: a review", IET Quantum Communication, IET Journals, doi: 10.1049/iet.qtc.2019. 0005, 2019, pp. 9-15.

Dynes, J F, et al., "Cambridge quantum network", npj nature partner journals, https://doi.org/10.1038/s41534-019-0221-4, 2019, 8 pages.

Fröhlich, Bernd , et al., "Quantum secured gigabit optical access networks", Scientific Reports, DOI: 10.1038/srep18121, Dec. 14, 2015, 7 pages.

Moghaddam, Elham Ehsani, et al., "Resource Allocation in Space Division Multiplexed Elastic Optical Networks Secured with Quantum key Distribution", IEEE Journal on Selected Areas in Communications, vol. 39, No. 9, Sep. 2021, 13 pages.

Phoenix, Simon , et al., "Multi-user Quantum Cryptography on Optical Networks", Journal of Modern Optics, Jun. 1995, 11 pages.

Zhang, Qiang , et al., "Quantum information research in China", Quantum Science and Technology, Quantum Sci. Technol. 4(2019)040503, IOP Publishing, https://doi.org/10.1088/2058-9565-ab4bea, 2019, 8 pages.

Zhao, Yongli , et al., "Resource Allocation in Optical Networks Secured by Quantum Key Distribution", Optical Communications, IEEE Communications Magazine, Aug. 2018, pp. 130-137.

* cited by examiner

QUANTUM COMMUNICATION METHOD AND APPARATUS

TECHNICAL FIELD

The invention relates to a method of quantum communication, quantum communication apparatus and a communication network node.

BACKGROUND

One of the main problems faced by current quantum communication methods arises from the limited rate of key generation by the quantum key distribution, QKD, system. After creating a shared secret key, two parties (generally referred to as Alice and Bob) can use the key as a one-time pad to encrypt information that is to be communicated. There are several methods to enhance the key generated by QKD but these deteriorate the security level of the encoding. Even using these methods, it is often the case that keys are still not generated fast enough to provide constant highest quality transmission.

In order to deal with the limited key generation rate methods have been proposed to buffer the keys at both sides (i.e. at Alice and at Bob) and then use the buffered keys for the encryption of the information to be transmitted (which may be referred to as the "classical communication"). If the information to be transmitted has a larger bandwidth than the key generation rate can support (even when enhanced) then keys from the buffer may be used for the encryption.

Existing deployed QKD systems use different optical channels for the key distribution (which may be referred to as the "quantum communication") and the classical communication. However, this may result in redundant infrastructure which makes the whole system costly. An alternative approach is for the quantum communication and the classical communication to share an optical channel, as reported by Frölich et al, "Quantum secured gigabit optical access networks", Sci. Rep. 5, 18121 (2015)". However, this arrangement gives rise to the problem that no matter how the wavelengths of the quantum and classical communication are differentiated, noise and interference phenomena are present, including: Amplified spontaneous emission; Spontaneous Raman scattering; Leakage from the classical channel; Four-wave mixing; and Cross-phase modulation. As a result, the bit to error ratio for the information to be communicated is decreased and thus the key generation rate is lowered too.

SUMMARY

It is an object to provide an improved method of quantum communication. It is a further object to provide an improved quantum communication apparatus. It is a further object to provide an improved communications network node.

An aspect provides a method of quantum communication. The method comprises the following steps. A step of receiving data for encrypted transmission on an optical channel. A step of determining a fill level of a key buffer storing shared secret key bits distributed by a quantum key distribution, QKD, system via the optical channel. A step of determining a bandwidth and an encryption technique for encrypted transmission of the data dependent on the determined fill level. A step of encrypting the data using the determined encryption technique. A step of transmitting the encrypted data at the determined bandwidth on the optical channel. A step of determining a quantum key generation rate required to support ongoing encrypted transmission of data on the optical channel at the determined bandwidth and encryption technique. A step of configuring the QKD system to perform quantum key generation at the determined quantum key generation rate.

The method advantageously makes the key generation and the bandwidth and encryption technique used for the classical communication mutually dependent. The quantum communication is thus enabled to reach a stable, optimal state in which the bandwidth and encryption technique of the classical communication depends on the availability of keys and the key generation rate, not on the data or information to be transmitted. The method advantageously enables optimization of the quality and security of the transmitted data and efficient and dynamic sharing of optical resources in quantum communications.

In an embodiment, the quantum key generation rate is determined dependent on an available bandwidth of the optical channel, the available bandwidth being a total bandwidth of the optical channel less the determined bandwidth for encrypted transmission of the data using the determined encryption technique. The quantum communication is thus enabled to reach a stable, optimal state in which the bandwidth and encryption technique of the classical communication depends on the channel capacity and the encryption technology that is used.

In an embodiment, the data comprises bandwidth and jitter critical data. The method advantageously ensures that sufficient keys are available for encryption, to enable continuing transmission of bandwidth and jitter critical data In an embodiment, the data comprises media traffic, such as video traffic. The method advantageously ensures continuing transmission of media traffic at a bandwidth optimised to the optical channel.

In an embodiment, the step of determining a bandwidth for encrypted transmission of the data comprises selecting one of a plurality of Quality of Service, QoS, levels dependent on the determined fill level. The method advantageously ensures continuing transmission of encrypted media traffic at a quality level that can be supported by the availability of keys.

In an embodiment, the selecting comprises determining which of the plurality of QoS levels the fill level is large enough to provide sufficient shared secret key bits for encryption of the data. The method is advantageously able to optimise the quality level at which ongoing transmission of encrypted data can be supported by the availability of keys.

The method enables the quantum communication to be configured within certain limits. For example, not allowing high definition, HD, video but only lower resolution video ensures that there are always keys available in the buffer for use when HD video is required in a critical scenario. This is not only valid for video but for all bandwidth and jitter critical Information transmission.

In an embodiment, said determining comprises estimating an amount of data to be transmitted during a predetermined time period. Respective numbers of key bits required to encrypt the estimated amount of data for the QoS levels are estimated. A highest level of the QoS levels for which the fill level meets the respective estimated number of key bits is determined. The method is advantageously able to optimise the quality level at which encrypted data can be transmitted during a certain time period. The method advantageously controls the transmission rate of the classical data and achieves an optimal transmission state based on the estimation of the amount of data, which may be deterministic in the case of a known transmission, for example pre-recorded video/data of a known duration, and is estimated for ad hoc communication.

In an embodiment, the method further comprises limiting a bandwidth at which data is received dependent on the determined bandwidth for encrypted transmission.

In an embodiment, determining an encryption technique comprises selecting one of One Time Pad, OTP, and Advanced Encryption Standard, AES, dependent on the determined fill level.

Corresponding advantages apply to the apparatus and node detailed below.

An aspect provides quantum communication apparatus comprising optical transmitter apparatus, quantum key distribution, QKD, apparatus, a key buffer and control apparatus. The optical transmitter apparatus is configured to receive data for encrypted transmission on an optical channel. The QKD apparatus is configured to distribute shared secret key bits via the optical channel. The key buffer is for storing shared secret key bits distributed via the optical channel. The control apparatus is configured to perform operations including the following. An operation of determining a fill level of the key buffer. An operation of determining a bandwidth and an encryption technique for encrypted transmission of the data dependent on the determined fill level. An operation of encrypting the data using the determined encryption technique. An operation of causing the optical transmitter apparatus to transmit the encrypted data at the determined bandwidth on the optical channel. An operation of determining a quantum key generation rate required to support ongoing encrypted transmission of data on the optical channel at the determined bandwidth and encryption technique. An operation of configuring the QKD apparatus to perform quantum key generation at the determined quantum key generation rate.

In an embodiment, the control apparatus comprises a classical communication controller, a quantum key generation controller and a shared controller. The shared controller is configured to perform operations including determining the fill level of the key buffer; determining the bandwidth and the encryption technique for encrypted transmission of the data dependent on the determined fill level; and determining the quantum key generation rate required to support ongoing encrypted transmission of data on the optical channel at the determined bandwidth and encryption technique. The classical communication controller is configured to perform operations including: encrypting the data using the determined encryption technique; and causing the optical transmitter apparatus to transmit the encrypted data at the determined bandwidth on the optical channel. The quantum key generation controller is configured to perform operations including: reporting a current key generation rate to the shared controller; and configuring the QKD apparatus to perform quantum key generation at the determined quantum key generation rate.

In an embodiment, the quantum key generation rate is determined dependent on an available bandwidth of the shared optical channel, the available bandwidth being a total bandwidth of the shared optical channel less the determined bandwidth for encrypted transmission of the data using the determined encryption technique.

In an embodiment, the data comprises bandwidth and jitter critical data.

In an embodiment, the data comprises media traffic, such as video traffic.

In an embodiment, determining a bandwidth for encrypted transmission of the data comprises selecting one of a plurality of Quality of Service, QoS, levels dependent on the determined fill level. The quantum control layer thus advantageously take into account the quality-of-service requirements of the classical communication.

In an embodiment, the selecting comprises determining which of the plurality of QoS levels the fill level is large enough to provide sufficient shared secret key bits for encryption of the data.

In an embodiment, said determining comprises: estimating an amount of data to be transmitted during a predetermined time period; estimating respective numbers of key bits required to encrypt the estimated amount of data for the QoS levels; and determining a highest level of the QoS levels for which the fill level meets the respective estimated number of key bits.

In an embodiment, the classical communication controller is further configured to limit a bandwidth at which data is received dependent on the determined bandwidth for encrypted transmission.

In an embodiment, determining an encryption technique comprises selecting one of One Time Pad, OTP, and Advanced Encryption Standard, AES, dependent on the determined fill level.

In an embodiment, the shared controller comprises interface circuitry and processing circuitry configured to perform operations including determining the fill level of the key buffer; determining the bandwidth and the encryption technique for encrypted transmission of the data dependent on the determined fill level; and determining the quantum key generation rate required to support ongoing encrypted transmission of data on the optical channel at the determined bandwidth and encryption technique.

In an embodiment, the classical communication controller comprises interface circuitry and processing circuitry configured to perform operations including: encrypting the data using the determined encryption technique; and causing the optical transmitter apparatus to transmit the encrypted data at the determined bandwidth on the optical channel.

In an embodiment, the quantum key generation controller comprises interface circuitry and processing circuitry configured to perform operations including: reporting a current key generation rate to the shared controller; and configuring the QKD apparatus to perform quantum key generation at the determined quantum key generation rate.

Corresponding embodiments apply to the node detailed below.

An aspect provides a communications network node comprising quantum communication apparatus comprising optical transmitter apparatus, quantum key distribution, QKD, apparatus, a key buffer and control apparatus. The optical transmitter apparatus is configured to receive data for encrypted transmission on an optical channel. The QKD apparatus is configured to distribute shared secret key bits via the optical channel. The key buffer is for storing shared secret key bits distributed via the optical channel. The control apparatus is configured to perform operations including the following. An operation of determining a fill level of the key buffer. An operation of determining a bandwidth and an encryption technique for encrypted transmission of the data dependent on the determined fill level. An operation of encrypting the data using the determined encryption technique. An operation of causing the optical transmitter apparatus to transmit the encrypted data at the determined bandwidth on the optical channel. An operation of determining a quantum key generation rate required to support ongoing encrypted transmission of data on the optical channel at the determined bandwidth and encryption technique.

An operation of configuring the QKD apparatus to perform quantum key generation at the determined quantum key generation rate.

In an embodiment, the communications network node is one of an optical network unit, ONU, and an optical line terminal, OLT.

Embodiments of the invention will now be described, by way of example only, with reference to the accompanying drawings.

DETAILED DESCRIPTION

The same reference numbers will used for corresponding features in different embodiments.

Figure 1:
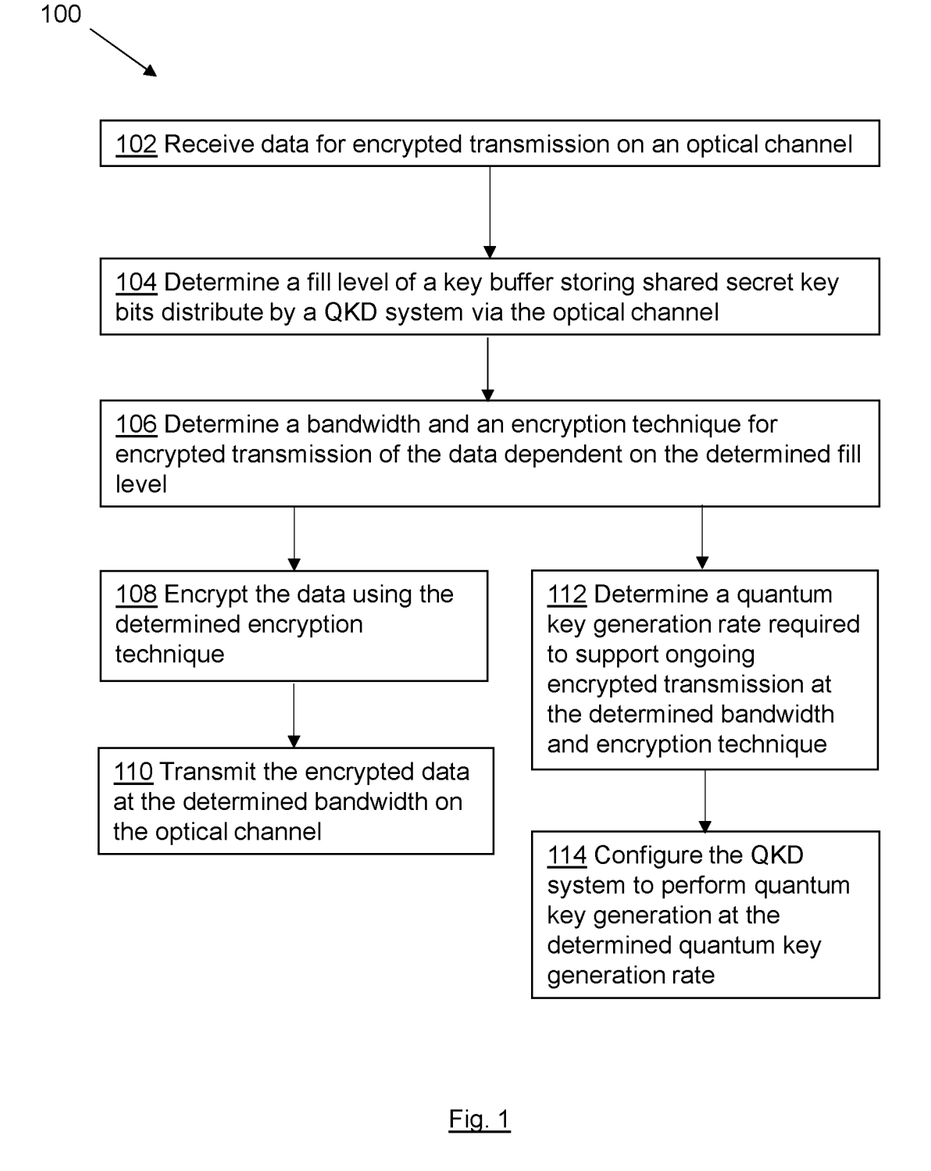
FIGS. 1 and 2 are flowcharts illustrating embodiments of method steps.

An embodiment of the invention provides a method 100 of quantum communication, steps of which are illustrated in FIG. 1.

The method comprises receiving 102 data for encrypted transmission on an optical channel. A fill level of a key buffer is determined 104; the key buffer storing shared secret key bits distributed by a quantum key distribution, QKD, system via the optical channel. Determining the fill level provides an indication of the number of shared secret key bits available for use in encrypting the data.

A bandwidth and an encryption technique for encrypted transmission of the data are then determined 106 dependent on the determined fill level. The data is encrypted 108 using the determined encryption technique and is then transmitted 110 at the determined bandwidth on the optical channel.

The method further comprises determining 112 a quantum key generation rate required to support ongoing encrypted transmission of data on the optical channel at the determined bandwidth and encryption technique. The QKD system is then configured 114 to perform quantum key generation at the determined quantum key generation rate.

In an embodiment, the quantum key generation rate is determined dependent on an available bandwidth of the optical channel. The available bandwidth is a total bandwidth of the optical channel less the determined bandwidth for encrypted transmission of the data using the determined encryption technique.

In an embodiment, the data comprises bandwidth and jitter critical data.

In an embodiment, the data comprises media traffic, such as video traffic.

In an embodiment, the bandwidth for encrypted transmission of the data is determined by selecting one of a plurality of Quality of Service, QoS, levels dependent on the determined fill level of the key buffer. The QoS levels may be different video QoS levels, such as Standard definition, SD, High Definition, HD, and Full HD, as defined in ITU-T video coding standard H.262/MPEG-2 Part 2.

In an embodiment, the selecting of one of the plurality of QoS levels comprises determining which of the plurality of QoS levels the key buffer fill level is large enough to provide sufficient shared secret key bits for encryption of the data.

For example, transmission of video media at different video QoS levels, e.g. Full HD, HD and SD, involves transmission of different amounts of data. Encrypting video media for transmission therefore requires different amounts of shared secret key bits depending on which video QoS level in being used. The key buffer fill level therefore needs to be higher to support Full HD than HD or SD, for example. The method is therefore able to limit use of video QoS levels to those that the fill level of the key buffer can support.

The method enables the quantum communication to be configured within certain limits. For example, not allowing high definition, HD, video but only lower resolution video ensures that there are always keys available in the buffer for use when HD video is required in a critical scenario. This is not only valid for video but for all bandwidth and jitter critical Information transmission.

In an embodiment, determining which of the plurality of QoS levels the key buffer fill level is large enough for comprises estimating an amount of data to be transmitted during a predetermined time period. Respective numbers of key bits required to encrypt the estimated amount of data for the QoS levels are estimated. A highest level of the QoS levels for which the fill level meets the respective estimated number of key bits is determined.

In an embodiment, the method further comprises limiting a bandwidth at which data is received dependent on the determined bandwidth for encrypted transmission. This may be achieved by notifying a provider of the data for encrypted transmission of the bandwidth available on the optical channel. For example, in the case of video media transmission the provider may be notified of the video QoS level that is available for use.

In an embodiment, determining an encryption technique comprises selecting one of One Time Pad, OTP, and Advanced Encryption Standard, AES, dependent on the determined fill level. OTP is the most secure encryption technique but requires more shared secret key bits to be available than AES, so the buffer fill level is also relevant in determining which encryption technique may be used.

A problem faced by quantum communication of data that is bandwidth and jitter critical, such as video media transmission, may be understood by considering the following example. Alice and Bob start a video conference; they already have a buffer of shared keys, with a maximum size $b\_max=b(A)=b(B)$. The key generation rate is $r\_max$ on an empty channel (i.e. no classical communication is occurring) and $r(t)$ at time t when there is also $b(t)$ classical communication on the channel. Let $r\_max>r(L)>r(M)>r(H)>0$ be the key generation rates for Low (L), Medium (M) and High (H) quality video respectively.

In a first period, Alice and Bob start the video conference using High quality video which may result in exhausting the buffered key bits and then transmission of the video media will brake, and eventually drop to zero due to the lack of keys for encryption. With video media transmission (i.e. classical communication) at zero, the key generation rate can jump to $r\_max$ and the key buffer will be re-filled. Once the buffer again contains shared keys, transmission of the video media can restart.

It is easy to understand that, in such a scenario, there will be significant fluctuation in data transmission which might end up in a very low quality user experience. There are two potential solutions for this problem:

1) Do not share the channel resource and limit the video transmission (i.e. the rate at which keys are required for encryption) to the key generation rate.

2) When the quantum and classical communication share a channel, limit both the key generation rate and classical communication transmission bandwidth to avoid the transmission breaking.

The methods and apparatus of the described embodiments enable better performance to be achieved in the second solution.

Figure 2:
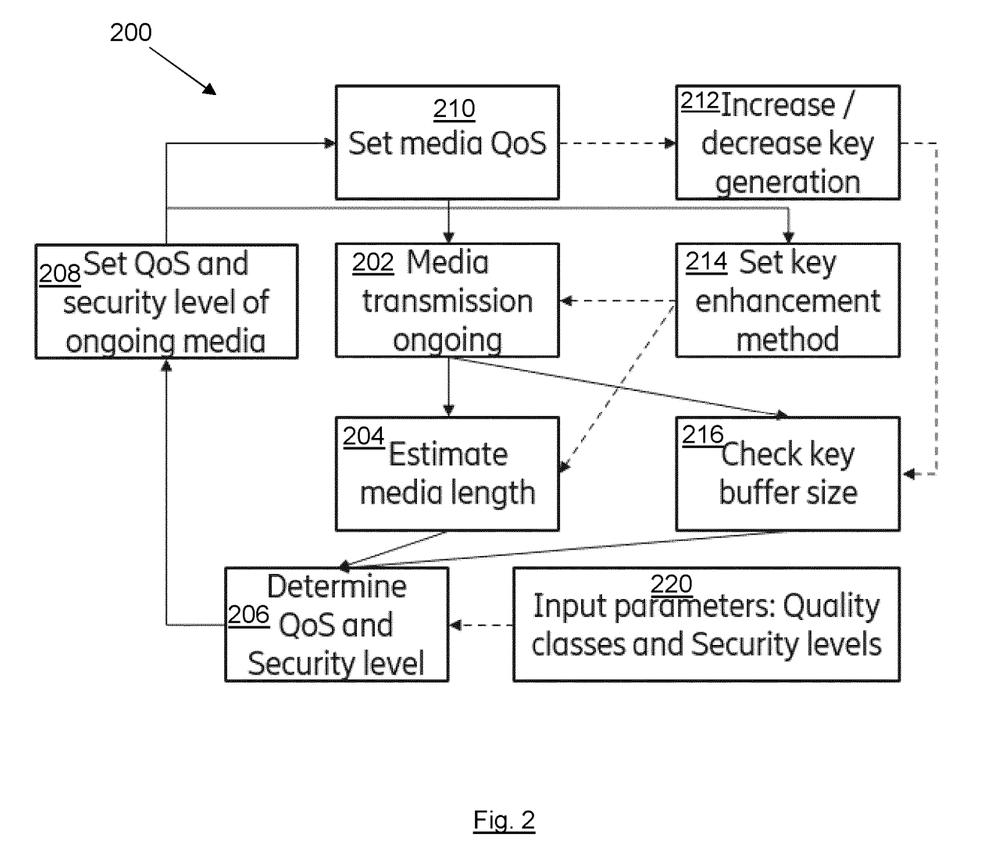

An embodiment of the invention provides a method 200 of quantum communication, steps of which are illustrated in FIG. 2.

Data, for example video media, is received for encrypted transmission on an optical path. Transmission of the video media is ongoing 202 at a bit rate, $b(t_i)$. The QKD system is performing key generation at a key generation rate, $r(t_i)$.

An estimate, $Est(t_i)$, is made 204 of the amount of data to be transmitted during a predetermined time period, dT, (also referred to as the "media length") using a probabilistic prediction method, such as a Markovian process (for example, an autoregressive integrated moving average, ARIMA, process or an autoregressive fractionally integrated moving-average, FARIMA, process). A simple constant dT is used in the media length estimation, i.e. at every time it is predicted that the video media will last for an additional time, dT.

Alternatively, assuming a total media length, $t_{media}$, is know the estimate can be made as the total media length less an amount of data, $t_i$, transmitted up to the current time, i:

$$Est(t_i) = t_{media} - t_i$$

assuming that transmission of the data started at t=0.

Alternatively, the remaining media length may be provided by the media owner from which the data to be transmitted is received.

The key buffer size is checked 216 to determine the fill level. Input parameters, namely QoS levels ("Quality classes") and security levels, e.g. basic and advanced, are received 220.

Based on the estimated media length and the key buffer fill level, $buff(t_i)$, the QoS level, $QoS(t_i)$, and the security level, $Security(t_i)$, to be used for ongoing transmission of the video media are determined 206 and set 208. This includes determining whether the key buffer fill level and the key generation rate are large enough, with a selected probability, to provide sufficient shared secret key bits for encryption of the received data.

Then the video media QoS is set 210, for example according to the session initiation protocol, SIP, standard (IETF RFC 3261) and the encryption technique to be used (the "key enhancement method") is set 214 by selecting between OTP and AES. For example, a security level of "maximum" may be set and OTP encryption accordingly selected.

By setting the required bandwidth for the video media, the key generation rate is inherently increased or decreased since not only interference between classical and quantum communication changes but also the bandwidth available on the optical channel for QKD changes. This will also affect the buffer fill level at the next time instant the method is applied.

The required maximal bandwidth of the video media may be considered to be stable which is a feasible assumption as the encoding of video media is usually set to the highest QoS by default. The QoS or bit rate may of course decrease due to non-network reasons.

When the key generation rate is larger than or equal to the rate at which keys are required for encryption of data, the data may be encrypted and transmitted with the media owner's specified encryption technique and QoS level.

Figure 3:
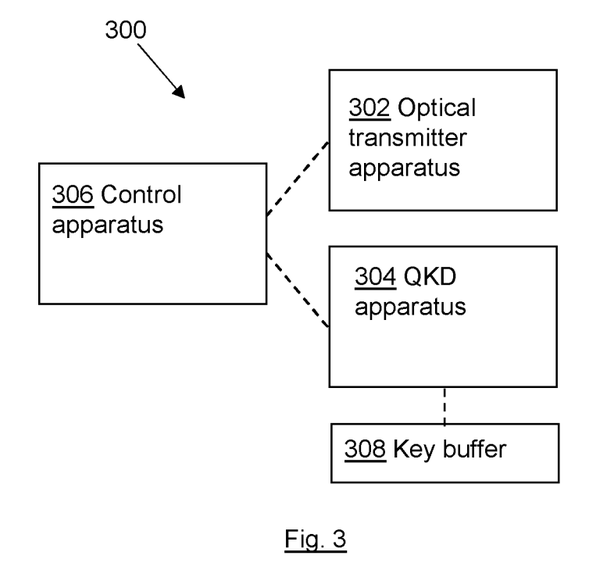
FIGS. 3 and 4 are block diagrams illustrating embodiments of quantum communication apparatus.

Referring to FIG. 3, an embodiment provides quantum communication apparatus 300 comprising optical transmitter apparatus 302, quantum key distribution, QKD, apparatus 304, a key buffer 304 and control apparatus 306.

The optical transmitter apparatus is configured to receive data for encrypted transmission on an optical channel. The QKD apparatus is configured to distribute shared secret key bits via the optical channel. The key buffer is for storing shared secret key bits distributed via the optical channel.

The control apparatus 306 is configured to perform operations including:
  determining a fill level of the key buffer;
  determining a bandwidth and an encryption technique for encrypted transmission of the data dependent on the determined fill level;
  encrypting the data using the determined encryption technique;
  causing the optical transmitter apparatus to transmit the encrypted data at the determined bandwidth on the optical channel;
  determining a quantum key generation rate required to support ongoing encrypted transmission of data on the optical channel at the determined bandwidth and encryption technique; and
  configuring the QKD apparatus to perform quantum key generation at the determined quantum key generation rate.

Figure 4:
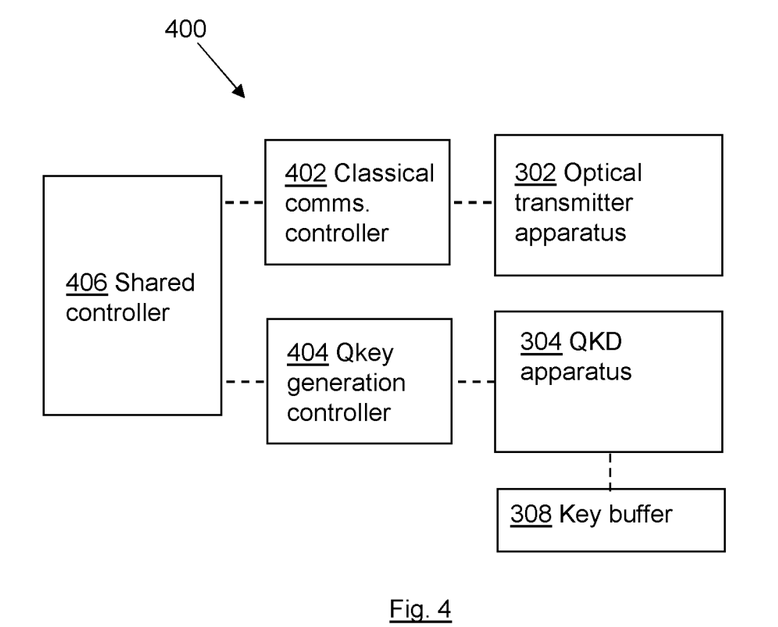

Referring to FIG. 4, an embodiment provides quantum communication apparatus 300 comprising optical transmitter apparatus 302, quantum key distribution, QKD, apparatus 304, a key buffer 304 and control apparatus.

The control apparatus comprises a classical communication controller 402, a quantum key generation controller 404 and a shared controller 406.

The shared controller is configured to perform operations including:
  determining the fill level of the key buffer;
  determining the bandwidth and the encryption technique for encrypted transmission of the data dependent on the determined fill level; and
  determining the quantum key generation rate required to support ongoing encrypted transmission of data on the optical channel at the determined bandwidth and encryption technique.

The classical communication controller is configured to perform operations including:
  encrypting the data using the determined encryption technique; and
  causing the optical transmitter apparatus to transmit the encrypted data at the determined bandwidth on the optical channel.

The quantum key generation controller is configured to perform operations including:
  reporting a current key generation rate to the shared controller; and
  configuring the QKD apparatus to perform quantum key generation at the determined quantum key generation rate.

In an embodiment, the quantum key generation rate is determined dependent on an available bandwidth of the optical channel. The available bandwidth is a total bandwidth of the optical channel less the determined bandwidth for encrypted transmission of the data using the determined encryption technique.

In an embodiment, the data comprises bandwidth and jitter critical data.

In an embodiment, the data comprises media traffic, such as video traffic.

In an embodiment, the shared controller is configured to determine the bandwidth for encrypted transmission of the data by selecting one of a plurality of Quality of Service, QoS, levels dependent on the determined fill level of the key buffer. The QoS levels may be different video QoS levels, such as Standard definition, SD, High Definition, HD, and Full HD, as defined in ITU-T video coding standard H.262/MPEG-2 Part 2

In an embodiment, the shared controller is configured to select one of the plurality of QoS levels by determining which of the plurality of QoS levels the key buffer fill level is large enough to provide sufficient shared secret key bits for encryption of the data. For example, transmission of video media at different video QoS levels, e.g. Full HD, HD and SD, involves transmission of different amounts of data. Encrypting video media for transmission therefore requires different amounts of shared secret key bits depending on which video QoS level in being used. The key buffer fill level therefore needs to be higher to support Full HD than HD or SD, for example. The shared controller is able to limit use of video QoS levels to those that the fill level of the key buffer can support.

The apparatus enables the quantum communication to be configured within certain limits. For example, not allowing high definition, HD, video but only lower resolution video ensures that there are always keys available in the buffer for use when HD video is required in a critical scenario. This is not only valid for video but for all bandwidth and jitter critical Information transmission.

In an embodiment, the shared controller is configured to determine which of the plurality of QoS levels the key buffer fill level is large enough for by estimating an amount of data to be transmitted during a predetermined time period. Respective numbers of key bits required to encrypt the estimated amount of data for the QoS levels are estimated. A highest level of the QoS levels for which the fill level meets the respective estimated number of key bits is determined.

In an embodiment, the classical controller is further configured to limit a bandwidth at which data is received dependent on the determined bandwidth for encrypted transmission. This may be achieved by configuring the classical controller to notify a provider of the data for encrypted transmission of the bandwidth available on the optical channel. For example, in the case of video media transmission the provider may be notified of the video QoS level that is available for use.

In an embodiment, the shared controller is configured to determine an encryption technique by selecting one of One Time Pad, OTP, and Advanced Encryption Standard, AES, dependent on the determined fill level. OTP is the most secure encryption technique but requires more shared secret key bits to be available than AES, so the buffer fill level is also relevant in determining which encryption technique may be used.

Figure 5:
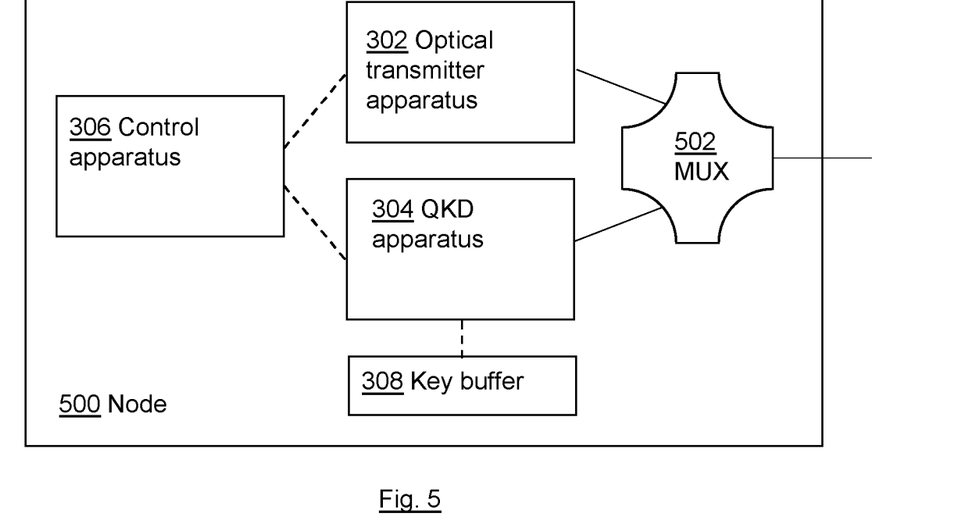
FIGS. 5 and 6 are block diagrams illustrating embodiments of communications network nodes.

Referring to FIG. 5, an embodiment provides a communications network node 500 comprising quantum communication apparatus comprising optical transmitter apparatus 302, quantum key distribution, QKD, apparatus 304, a key buffer 304 and control apparatus 306, as described above with reference to FIG. 3.

An optical multiplexer 502, such as a WDM optical mixer, is provided to couple the optical transmitter apparatus 302 and the QKD apparatus 304 to the optical channel.

Figure 6:
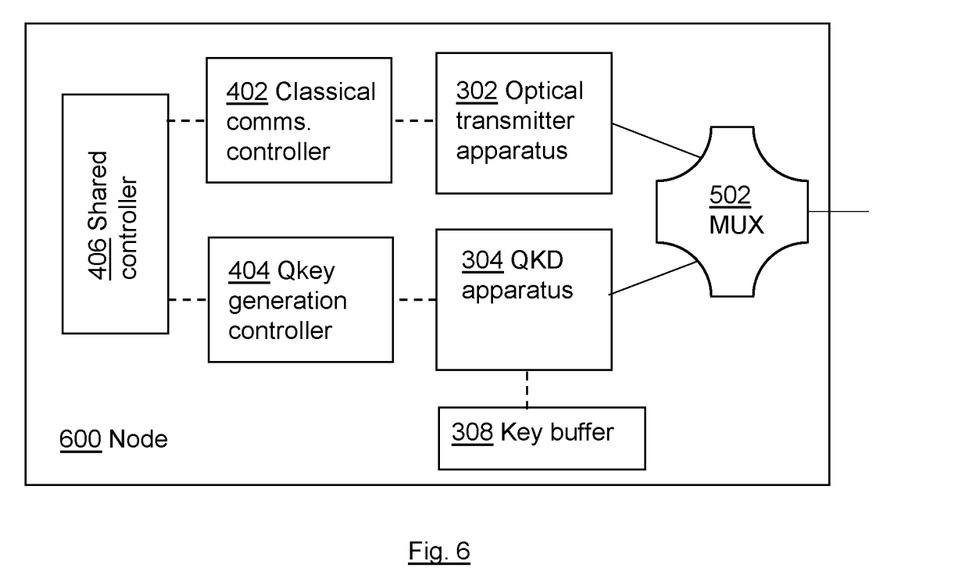

Referring to FIG. 6, an embodiment provides a communications network node 600 comprising quantum communication apparatus comprising optical transmitter apparatus 302, quantum key distribution, QKD, apparatus 304, a key buffer 304 and control apparatus 402, 404, 406, as described above with reference to FIG. 4.

Figure 7:
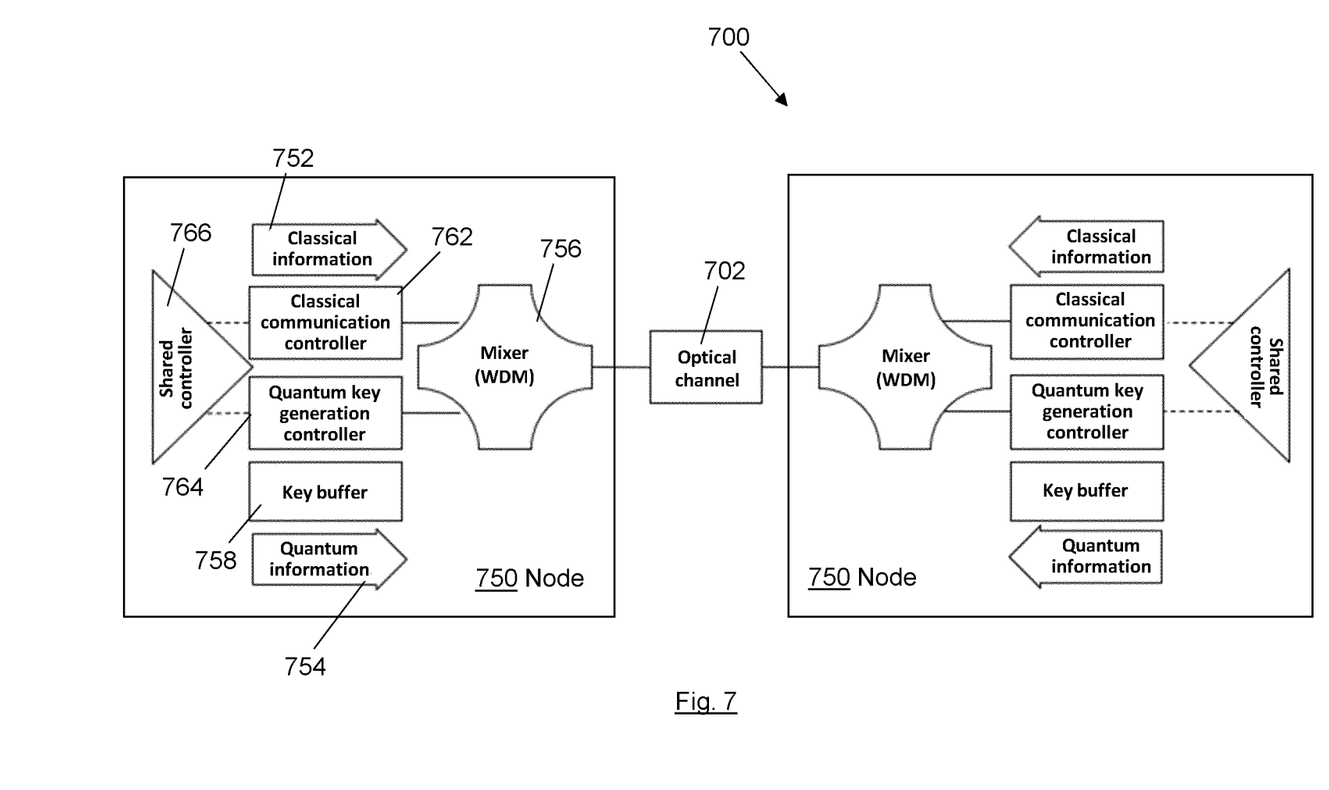
FIG. 7 is a block diagram illustrating a quantum communications network.

FIG. 7 illustrates a quantum communication network 700 comprising two communication network nodes 750 connected by an optical channel 702.

The communication network nodes 750 comprise quantum communication apparatus comprising optical transmitter apparatus ("classical information") 752, quantum key distribution, QKD, apparatus ("Quantum information") 754, a key buffer 758 and control apparatus. An WDM optical mixer 756, is provided to couple the optical transmitter apparatus 752 and the QKD apparatus 754 to the optical channel 702.

The control apparatus comprises a classical communication controller 762, a quantum key generation controller 764 and a shared controller 766.

The quantum key, Qkey, generation controller is configured to report the key generation rate to the shared controller and to adjust the key generation rate dependent on the bit rate or the channel capacity used by the classical communication. If there is no classical communication ongoing and the buffer is not full, then the Qkey generation controller sets the key generation rate to maximum. Shared secret keys are generated and the key buffer is being filled.

The key buffer stores shared secret keys generated by the QKD system and can communicate its current fill level to the shared controller.

The classical communication controller configured to notify the provider of the data (the "classical information") for encrypted transmission of the bandwidth available on the optical channel (in real time and also may prognose for the future and for the past if required). The classical communication controller is able to limit the data received from the provider, by acting as a restricted bandwidth channel.

The shared controller is configured to determine the optimal working point for the quantum communication apparatus in the nodes 750, by controlling the bandwidth, encryption technique and key generation rate, as described above. The shared controller is in communication with and configured to control the classical communication controller and the quantum key generation controller to implement the methods described above.

The invention claimed is:

1. A method of quantum communication, the method comprising steps of:
receiving data for encrypted transmission on an optical channel;
determining a fill level of a key buffer storing shared secret key bits distributed by a quantum key distribution (QKD) system via the optical channel;
determining a bandwidth and an encryption technique for encrypted transmission of the data dependent on the determined fill level;
encrypting the data using the determined encryption technique;
transmitting the encrypted data at the determined bandwidth on the optical channel;

determining a quantum key generation rate required to support ongoing encrypted transmission of data on the optical channel at the determined bandwidth and encryption technique; and configuring the QKD system to perform quantum key generation at the determined quantum key generation rate.

2. The method of claim 1, wherein the quantum key generation rate is determined dependent on an available bandwidth of the optical channel, the available bandwidth being a total bandwidth of the optical channel less the determined bandwidth for encrypted transmission of the data using the determined encryption technique.

3. The method of claim 2, wherein the optical channel is also used for transmission of other data and the available bandwidth is the total bandwidth of the optical channel less the determined bandwidth for encrypted transmission of the data using the determined encryption technique and less a transmission bandwidth of said other data.

4. The method of claim 1, wherein the data comprises bandwidth and jitter critical data.

5. The method of claim 4, wherein the data comprises media traffic.

6. The method of claim 1, wherein determining a bandwidth for encrypted transmission of the data comprises selecting one of a plurality of Quality of Service (QOS) levels dependent on the determined fill level.

7. The method of claim 6, wherein the selecting comprises determining which of the plurality of QoS levels the fill level is large enough to provide sufficient shared secret key bits for encryption of the data.

8. The method of claim 7, wherein said determining comprises:
estimating an amount of data to be transmitted during a predetermined time period;
estimating respective numbers of key bits required to encrypt the estimated amount of data for the QoS levels; and
determining a highest level of the QoS levels for which the fill level meets the respective estimated number of key bits.

9. The method of claim 1, further comprising limiting a bandwidth at which data is received dependent on the determined bandwidth for encrypted transmission.

10. The method of claim 1, wherein determining an encryption technique comprises selecting one of One Time Pad (OTP) and Advanced Encryption Standard (AES), dependent on the determined fill level.

11. A quantum communication apparatus comprising:
optical transmitter apparatus configured to receive data for encrypted transmission on an optical channel;
quantum key distribution (QKD) apparatus configured to distribute shared secret key bits via the optical channel;
a key buffer for storing shared secret key bits distributed via the optical channel; and
control apparatus configured to perform operations including:
determining a fill level of the key buffer;
determining a bandwidth and an encryption technique for encrypted transmission of the data dependent on the determined fill level;
encrypting the data using the determined encryption technique;
causing the optical transmitter apparatus to transmit the encrypted data at the determined bandwidth on the optical channel;

determining a quantum key generation rate required to support ongoing encrypted transmission of data on the optical channel at the determined bandwidth and encryption technique; and
configuring the QKD apparatus to perform quantum key generation at the determined quantum key generation rate.

12. The quantum communication apparatus as claimed in claim 11, wherein the control apparatus comprises a classical communication controller, a quantum key generation controller and a shared controller, wherein:
the shared controller is configured to perform operations including:
determining the fill level of the key buffer;
determining the bandwidth and the encryption technique for encrypted transmission of the data dependent on the determined fill level; and
determining the quantum key generation rate required to support ongoing encrypted transmission of data on the optical channel at the determined bandwidth and encryption technique;
the classical communication controller is configured to perform operations including:
encrypting the data using the determined encryption technique; and
causing the optical transmitter apparatus to transmit the encrypted data at the determined bandwidth on the optical channel; and
the quantum key generation controller is configured to perform operations including:
reporting a current key generation rate to the shared controller; and
configuring the QKD apparatus to perform quantum key generation at the determined quantum key generation rate.

13. The quantum communication apparatus as claimed in claim 11, wherein the quantum key generation rate is determined dependent on an available bandwidth of the shared optical channel, the available bandwidth being a total bandwidth of the shared optical channel less the determined bandwidth for encrypted transmission of the data using the determined encryption technique.

14. The quantum communication apparatus as claimed in claim 13, wherein the optical channel is also used for transmission of other data and the available bandwidth is the total bandwidth of the optical channel less the determined bandwidth for encrypted transmission of the data using the determined encryption technique and less a transmission bandwidth of said other data.

15. The quantum communication apparatus as claimed in claim 11, wherein the data comprises bandwidth and jitter critical data.

16. The quantum communication apparatus as claimed in claim 15, wherein the data comprises media traffic.

17. The quantum communication apparatus as claimed in claim 11, wherein determining a bandwidth for encrypted transmission of the data comprises selecting one of a plurality of Quality of Service (QOS) levels dependent on the determined fill level.

18. The quantum communication apparatus as claimed in claim 17, wherein the selecting comprises determining which of the plurality of QoS levels the fill level is large enough to provide sufficient shared secret key bits for encryption of the data.

19. The quantum communication apparatus as claimed in claim 11, wherein determining an encryption technique comprises selecting one of One Time Pad (OTP) and Advanced Encryption Standard (AES), dependent on the determined fill level.

20. A communications network node comprising the quantum communication apparatus according to claim 11.

* * * * *